Sept. 8, 1959          O. M. LEWIS          2,903,050

CIRCUMFERENTIALLY TRAVELING TYPE TIRE BEAD LIFTING DEVICE

Filed Sept. 9, 1957          2 Sheets-Sheet 1

INVENTOR.
ORVAL M. LEWIS
BY
ATTORNEY

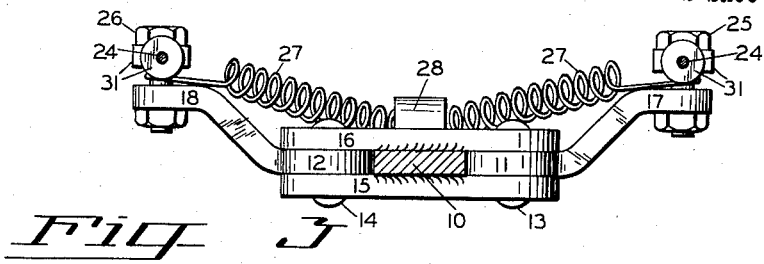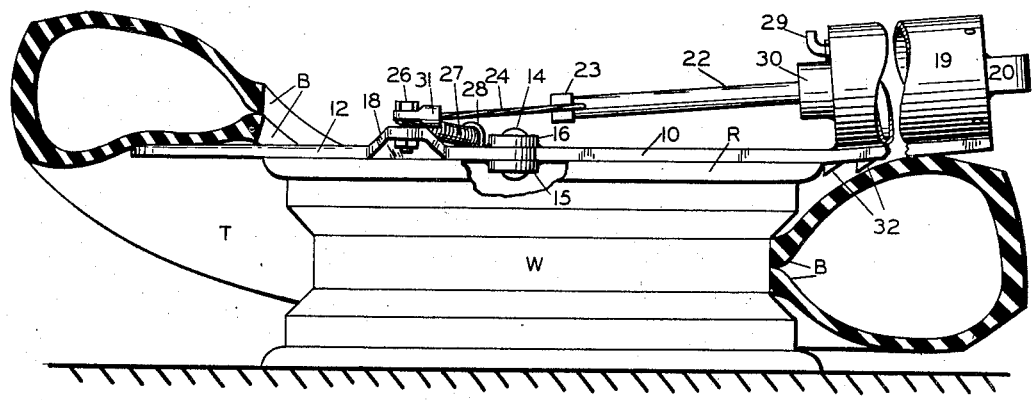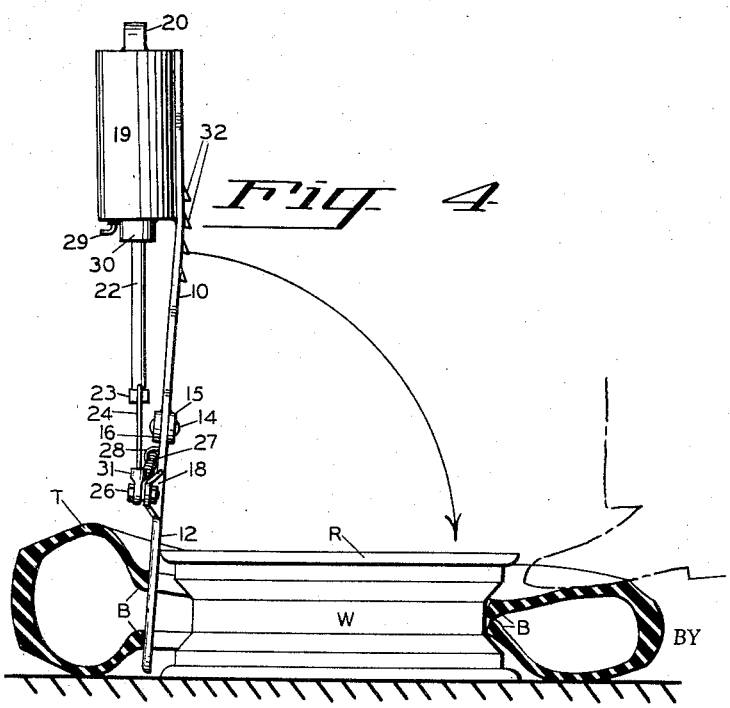

United States Patent Office 2,903,050
Patented Sept. 8, 1959

2,903,050

CIRCUMFERENTIALLY TRAVELING TYPE TIRE BEAD LIFTING DEVICE

Orval M. Lewis, Sweet Home, Oreg.

Application September 9, 1957, Serial No. 682,714

3 Claims. (Cl. 157—1.22)

The present invention relates to the removal of tires from vehicle wheels and is particularly adapted for use in removing modern tubeless tires from automobile wheels, especially wheels of the "drop center" type.

An object of this invention is to provide a compact and simplified tire removing device capable of being easily and quickly operated by the use of air under pressure, and consequently adapted for use at garages and automobile service stations wherever air under pressure is available for inflating tires.

Another object of the invention is to provide a compact, practical tire removing device which is adapted for use on a wheel while the wheel rests on its side on the floor, thus dispensing with the requirement of any other means for holding the wheel while the tire is being removed therefrom.

A further object of the invention is to provide a compact tire removing device which will be simple in construction and relatively easy and inexpensive to manufacture, so that it can be offered to the public at moderate cost.

The construction of this improved tire removing device with which these objects are accomplished, and the manner in which the device operates, will be readily understood from the following brief description and explanation.

In the description reference is made to the accompanying drawings in which:

Figure 3 is a section taken on line 3—3 of Figure 1 but drawn to a larger scale;

Figure 4 is a side elevation showing the position in which the device is first placed by the operator preparatory to removing the tire; and Figure 5 is a corresponding side elevation, but drawn to a larger scale, showing the next position in which the device is moved by the operator immediately preceding the removal of the tire from the wheel by the device.

Figure 1:
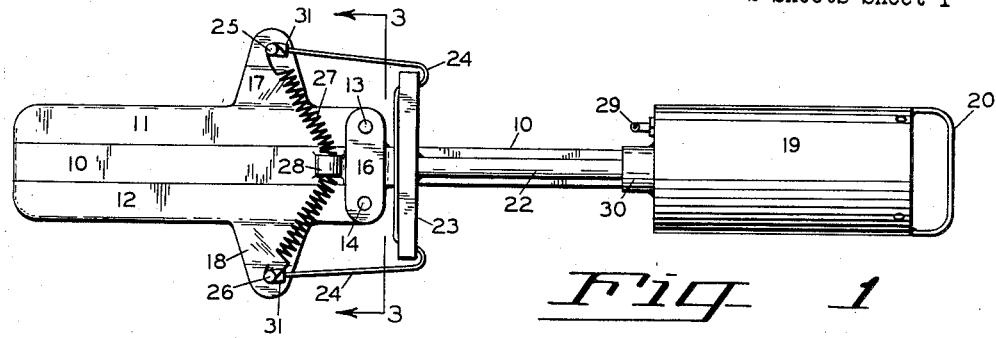
Figure 1 is a top plan view of the device by itself.
Figure 2:
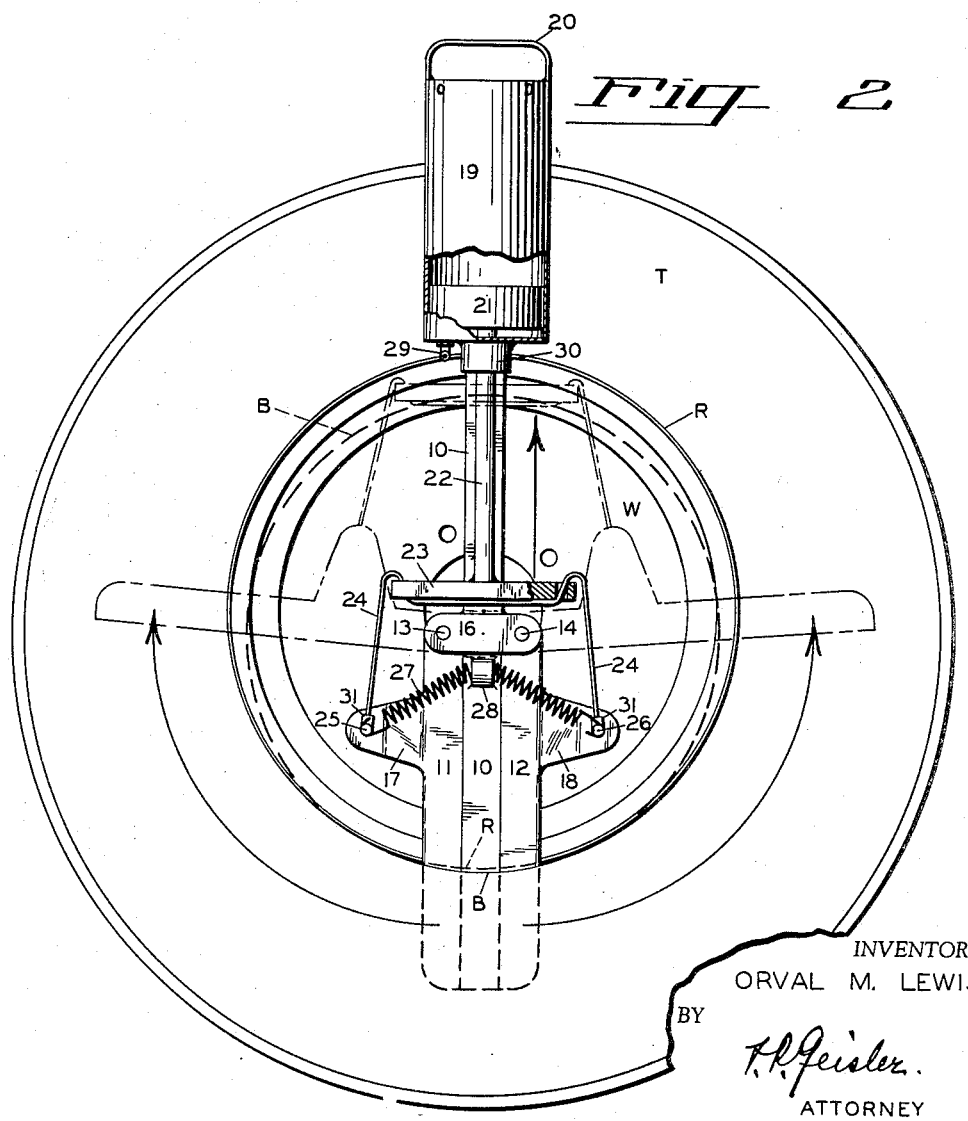
Figure 2 is a top plan view of the device set in position on a wheel from which the tire is to be removed, the pair of tire engaging arms of the device being shown in full line at the starting position for removing a tire, and the positions into which they are moved during the operation of the device being indicated by broken lines.

The device, referring first to Figures 1 and 2, includes a main or base member 10 comprising a flat rigid metal bar having a length considerably greater than the diameter of the vehicle wheel on which the device is to be used.

A pair of arms 11 and 12, preferably but not necessarily of the same thickness as the main member 10, are mounted on opposite sides of the main member 10. These arms are hinged at their inner ends on the hinge bolts 13 and 14 respectively, the hinge bolts extending through a pair of identical bottom and top cross plates 15 and 16 (see also Figure 3), the cross plates 15 and 16 being welded to the bottom and top faces respectively of the main member 10. The arms 11 and 12 extend from their hinge mounting to the end of the member 10, and, when in normal position, these arms rest against the opposite longitudinal edges of the main member 10 in the position shown in Figure 1. The arms 11 and 12 carry integral side brackets 17 and 18 respectively which extend upwardly and outwardly in opposite directions as shown best in Figure 3. On the bottom face of the main member 10, nearer the opposite end, are a series of spaced engageable elements or V-shaped lugs 32 (Figures 4 and 5), the purpose of which will be explained later.

An air cylinder 19 is secured on the opposite end of the main member 10, and a handle 20 for the entire device is mounted on the outer end, or top, of the cylinder 19. A piston 21 (Figure 2) is located within the air cylinder 19 and the piston rod 22 for the piston extends through the inner or bottom end of the cylinder and slides in a guide block 30 mounted on the cylinder. A suitable air valve 29, as for example a valve similar to an ordinary tire valve, is mounted at the bottom or inner end of the cylinder so as to enable air under pressure to be delivered into the cylinder and to enable air to exhaust from the cylinder, when and as desired.

A crosshead 23 is secured to the outer end of the piston rod 22, and the ends of the crosshead are connected respectively with the side brackets 17 and 18 of the arms 11 and 12. Various suitable means may be used for connecting the crosshead with the side brackets 17 and 18. The particular means illustrated in the drawings, which has been found to be very satisfactory and which is simple and inexpensive, consists of a wire or small cable 24 which passes through an aperture in each end of the crosshead and has ferrules 31 secured to its ends. These ferrules in turn are attached to bolts 25 and 26 mounted on the side brackets 17 and 18 respectively.

It will be apparent from Figures 1 and 2 that the delivery of air under pressure into the cylinder 19 through the valve 29 will cause the piston 21 to move towards the opposite end of the cylinder. This travel of the piston, producing corresponding travel of the piston rod 22 and the crosshead 23, in turn forces the arms 11 and 12 to swing outwardly on their hinge bolts 13 and 14 since the arm brackets 17 and 18 are connected with the crosshead. A coil spring 27 has its ends also secured to the bolts 25 and 26 on the brackets 17 and 18. This coil spring is under tension at all times and at its center the coil spring passes through a stationary U-shaped lug 28 mounted on the main member 10 adjacent the cross plate 16. Consequently the coil spring 27 exerts a force tending to hold the two arms 11 and 12 in normal position against the opposite side of main member 10, as shown in Figure 1, and returns them to this normal position as soon as the air in the cylinder 19 is allowed to exhaust.

The manner in which the device is employed in removing a tire from a vehicle wheel will now be briefly explained with reference to Figures 4, 5 and 2. In these figures W indicates the vehicle wheel and T indicates the tire desired to be removed from the wheel. When the tire is to be removed the wheel is placed on its side on the floor or ground. It will be apparent that, in order to remove the tire from the wheel, the two rim beads of the tire, indicated by B in Figures 4 and 5, must be lifted up over the top rim R of the wheel for at least 180° around the wheel rim circumference. When this is accomplished, the tire will readily slip from the wheel.

With the wheel and tire resting on the floor (as shown in Figure 4), the operator places his foot (indicated in broken lines in the figure) on the tire at one side in order to hold the wheel momentarily steady and in order also to collapse the tire sufficiently at that portion so as to push the top bead B down into the center groove or "drop center" portion of the wheel. The operator, holding the device by the handle 20 in substantially vertical position, inserts the end of the main member 10 and the adjacent ends of the arms 11 and 12 down in between the tire bead and the wheel at a point approximately diametrically opposite the location of the operator's foot on the tire. With the tire deflated and loose on the wheel, and also with the tire bead below the operator's foot engaging the center groove of the wheel, the operator will have no difficulty in thrusting the member 10 and the adjacent arms 11 and 12 down into the position shown in Figure 4.

Next, the operator, while still holding the device by the handle 20, uses the device as a lever and swings the device down into substantially horizontal position extending diametrically across the top of the wheel, as shown in Figure 5. This lever action forces the engaged portion of the tire up above the wheel rim R, but, due to the substantial amount of leverage gained, this raising of the tire does not require any excessive effort on the part of the operator. When the main member 10 is brought down so as to extend diametrically across the top of the wheel, one of the engageable elements or V-shaped lugs 32 will engage the outside of the top rim of the wheel.

While the device is in this position, as shown in Figure 5, the operator connects a compressed air hose to the valve 29. The delivery of air into the cylinder 19 immediately causes movement of the piston within the cylinder (from left to right as viewed in Figure 5). However this movement of the piston 21 and the movement of the piston rod and crosshead 23 forces the arms 11 and 12 to move in opposite directions along on the top rim of the wheel and thus causes the arms to move into the broken line position shown in Figure 2. The engagement of one of the lugs 32 with the outside edge of the rim R prevents the main member 10 from being pulled across the top of the wheel (from right to left as viewed in Figure 5) as the arms 11 and 12 move around between the tire and the wheel rim. When the arms 11 and 12 have moved into this position the operator pulls the device from the wheel, allowing the air in cylinder 19 to exhaust through the valve 29, which in turn permits the arms 11 and 12 to return to their normal position. Since the tire beads have been freed from the top rim of the wheel for more than one-half of their circumference the tire is now easily slid off from the wheel. The plurality of spaced rim-engaging lugs 32 on the bottom face of the member 10 enables the device to be used on different sized wheels.

It will be obvious that this entire operation of removing the tire is accomplished by means of the device in a few moments. Also it will be appreciated that the entire operation is performed with very little exertion on the part of the operator. Since the entire device is relatively small and light in weight it is easily carried about and requires only a small amount of storage space.

I claim:

1. In a device adapted for use in removing a tire from a vehicle wheel while the wheel is resting on its side on the floor, a main bar, a pair of arms hinged on opposite sides of said bar respectively to swing in the plane of said bar, the hinge mounting for said arms secured to said bar intermediate the ends of said bar, said arms extending from said mounting to one end of said bar and normally resting against the side edges of said bar, an air cylinder carried by the opposite end of said bar, a piston in said cylinder having a piston rod extending from said cylinder along said bar toward said hinge mounting, means connecting said arms with said piston rod, an air valve for said cylinder positioned so that the delivery of air into said cylinder will cause said piston rod to move further from said hinge mounting and thereby force said arms to swing outwardly from said main bar, and spring means returning said arms and said piston rod to normal position when the air is allowed to exhaust from said cylinder.

2. In a tire removing device of the character described, a flat bar having a length greater than the diameter of the wheel from which the tire is to be removed, a pair of arms hinged on opposite sides of said bar respectively to swing in the plane of said bar, the hinge mounting for said arms secured to said bar intermediate the ends of said bar, said arms extending from said mounting to one end of said bar and normally resting against the side edges of said bar, an air cylinder secured to the opposite end of said bar, a piston in said cylinder having a piston rod extending from said cylinder along said bar towards said hinge mounting, a bracket on each arm extending outwardly and upwardly therefrom, means connecting said brackets with said piston rod, an air valve for said cylinder positioned so that the delivery of air into said cylinder will cause said piston rod to move further from said hinge mounting and thereby pull said arms outwardly from said flat bar, and spring means returning said arms to normal position when the air is allowed to exhaust from said cylinder.

3. A device adapted for use in removing a tire from a vehicle wheel while the wheel is resting on its side on the floor, said device consisting of a flat lever bar having a length greater than the diameter of the wheel from which the tire is to be removed, a pair of arms hinged on opposite sides of said bar respectively to swing in the plane of said bar, the hinge mounting for said arms secured to said bar intermediate the ends of said bar, said arms extending from said mounting to one end of said bar and normally resting against the side edges of said bar, wheel-rim-engaging means on said bar between said hinge mounting and the opposite end of said bar, an air cylinder secured to said opposite end of said bar, a piston in said cylinder having a piston rod extending from said cylinder along said bar towards said hinge mounting, a crosshead on the outer end of said piston rod, a side bracket on each arm, means connecting said brackets with the ends of said crosshead respectively, an air valve for said cylinder positioned so that the delivery of air into said cylinder will cause said crosshead to move further from said hinge mounting and thereby pull said arms outwardly from said flat lever bar, and spring means returning said arms to normal position when the air is allowed to exhaust from said cylinder, whereby, when said first mentioned end of said flat lever bar and the adjacent ends of said arms are inserted between the tire and the wheel and said bar is brought into position extending diametrically across the wheel, the delivery of air into said cylinder will cause said arms to move in arcuate paths over along the rim of the wheel until a sufficient extent of the tire has been raised from the wheel to free the tire.

References Cited in the file of this patent

UNITED STATES PATENTS

| 2,189,683 | Schultz | Feb. 6, 1940 |
| 2,649,902 | Johnson | Aug. 25, 1953 |
| 2,778,414 | Oglesby | Jan. 22, 1957 |

FOREIGN PATENTS

| 26,145 | Great Britain | Nov. 14, 1913 |
| 877,413 | Germany | June 25, 1953 |